United States Patent [19]

Westell

[11] 4,037,161

[45] July 19, 1977

[54] RATIO DETECTOR

[75] Inventor: William E. Westell, Weston, Mass.

[73] Assignee: Baird-Atomic, Inc., Bedford, Mass.

[21] Appl. No.: 637,326

[22] Filed: Dec. 3, 1975

Related U.S. Application Data

[62] Division of Ser. No. 490,698, July 22, 1974, Pat. No. 3,951,548.

[51] Int. Cl.² .......................... H03D 13/00; G06J 1/00
[52] U.S. Cl. ............................... 328/133; 235/150.53; 356/5; 356/167
[58] Field of Search ............... 235/181, 150.53; 356/4, 356/5, 28, 167, 189, 170; 250/327 G, 231 SE; 328/133; 307/232

[56] References Cited

U.S. PATENT DOCUMENTS

| 3,551,808 | 12/1970 | Grossimon | 328/133 |
| 3,657,659 | 4/1972 | Johnson | 328/133 |
| 3,878,381 | 4/1975 | Broder et al. | 235/150.53 |
| 3,891,321 | 6/1975 | Hock | 356/169 |

OTHER PUBLICATIONS

Moore: Digital Phase Angle Meter Control, IBM Technical Disclosure Bulletin, vol. 3, No. 2, July 1960.

*Primary Examiner*—Felix D. Gruber
*Attorney, Agent, or Firm*—Morse, Altman, Oates & Bello

[57] ABSTRACT

An electro-optical device for generating data signals representing relative displacement between an aperture pattern in a reference plane and a reflective pattern in a measurement plane comprises a reference detector for sensing reference radiation directed towards the aperture pattern and a convolution detector for sensing the reference radiation reflected by the reflective pattern. The phase of a signal generated by the convolution detector is compared to the phase of a signal generated by the reference detector for generating the data signals defining the relative displacement between the aperture pattern and the reflective pattern.

1 Claim, 11 Drawing Figures

"X" - DISPLACEMENT OF REFLECTOR CENTROID RELATIVE TO APERTURE CENTROID

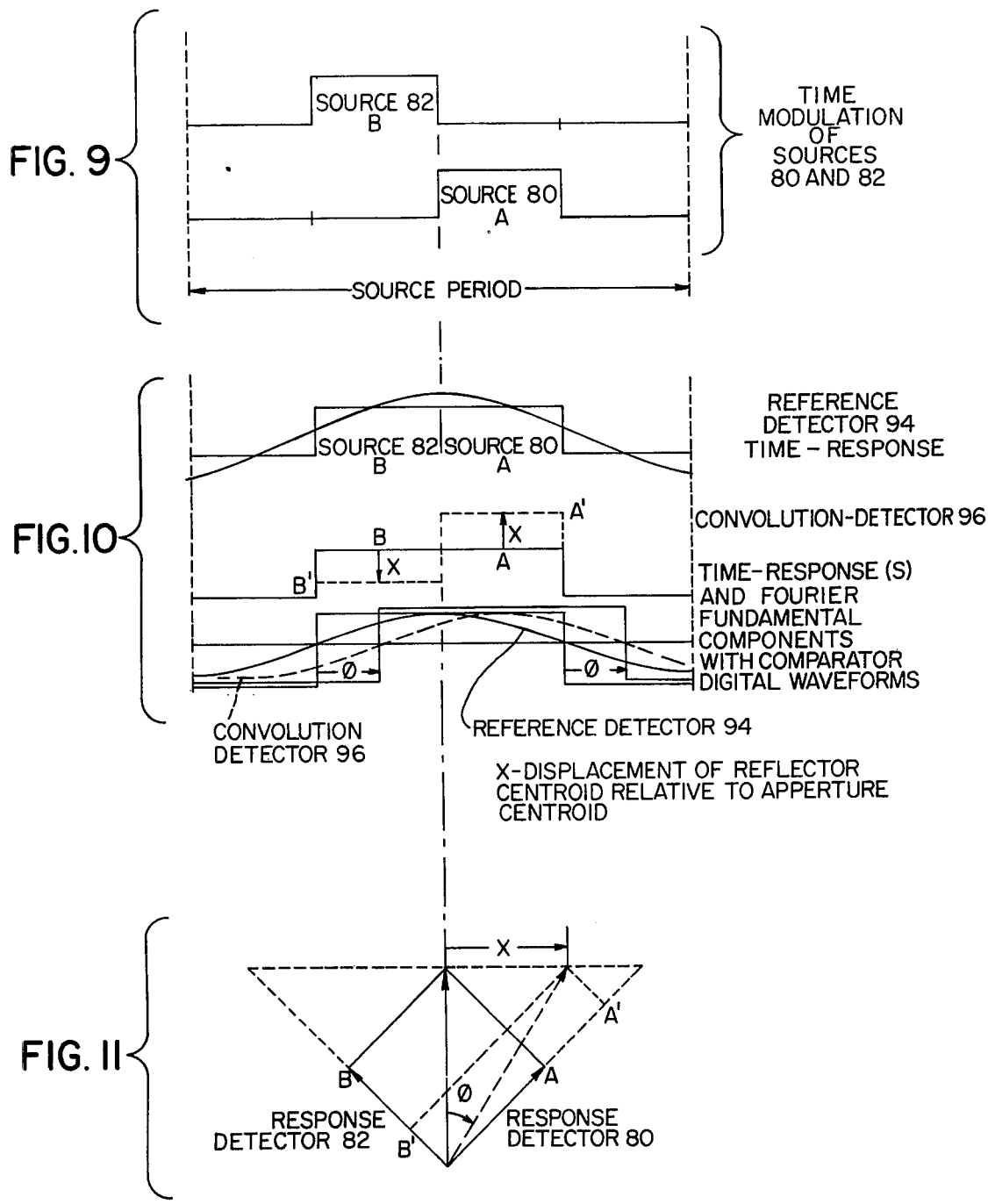

RATIO DETECTOR

This is a division of application Ser. No. 490,698, filed on July 22, 1974, now U.S. Pat. 3,951,548.

BACKGROUND OF THE INVENTION

2. Field of Invention

The present invention relates to electro-optical devices and more particularly to electro-optical measurement systems.

2. Description of the Prior Art

The optical resolution achievable with prior art electro-optical systems is limited primarily by optical-diffraction relations in both fabrication and readout of reference reticle patterns.

SUMMARY OF THE INVENTION

It is an object of the invention to provide an improved electro-optical system which does not suffer from the limitations of prior art electro-optical systems. The invention is characterized by an electro-optical system for generating data signals representing the relative displacement between an aperture pattern in a reference plane and a reflective pattern in a measurement plane. The novel electro-optical system comprises a reference detector for sensing reference radiation directed towards the aperture pattern and a convolution detector for sensing the reference radiation reflected by the reflective pattern. Signals generated by the reference detector and convolution detector represent the relative spatial displacement between the aperture pattern and the reflective pattern. These relative spatial displacement signals are converted to temporal waveforms having periodic phase or time relationships linearly related to the relative spatial relationships between the aperture and reflective patterns. The phase of the signal generated by the convolution detector is compared to the phase of the signal generated by the reference detector in a processor which generates data signals defining the relative displacement between the aperture pattern and the reflective pattern.

Other objects, features and advantages of the present invention will become more apparent after considering the following detailed disclosure.

The invention accordingly comprises the system possessing the construction, combination of elements, and arrangement of parts that are exemplified in the following detailed disclosure, the scope of which will be indicated in the appended claim.

BRIEF DESCRIPTION OF THE DRAWINGS

For a fuller understanding of the nature and objects of the present invention, reference should be had to the following detailed description taken in connection with the accompanying drawings, wherein:

FIG. 9 is a series of waveforms illustrating the time modulation of the radiation sources of FIGS. 5 and 6;

FIG. 10 is a series of waveforms illustrating the responses of the reference detector and convolution detector of FIGS. 5 and 6; and FIG. 11 is a vector representation of the fundamental Fourier component of the reference and convolution detectors responses of FIG. 10.

DETAILED DESCRIPTION OF THE PREFERRED EMBODIMENT

The electro-optical and electronic processing techniques of the present invention are based on the Fourier analysis theorem which states that a periodic waveform is fully described by two quadrature samples. In the present invention, quadrature samples in space are transformed by time modulation and interpolation into waveforms in time which are equivalent to those produced by a moving reference reticle. The encoding principles involved in the present invention are illustrated by the following description of two embodiments of the invention. In the first embodiment, FIGS. 1–4, a moving reference is employed to demonstrate the basic base-time-transformation encoding principles. In the second embodiment, FIGS. 5–11, a fixed reference is employed to illustrate the use of the Fourier theorem to eliminate the moving reference. In both embodiments, the relative spatial displacements between reference and measurement patterns are converted to temporal waveforms having periodic phase or time relations linearly related to their relative spatial relationships. These time relations are electronically converted to proportional analog or digital signals for presenting electronic output signals linearly related to the relative spatial displacements between the reference and measurement patterns.

Figure 1:
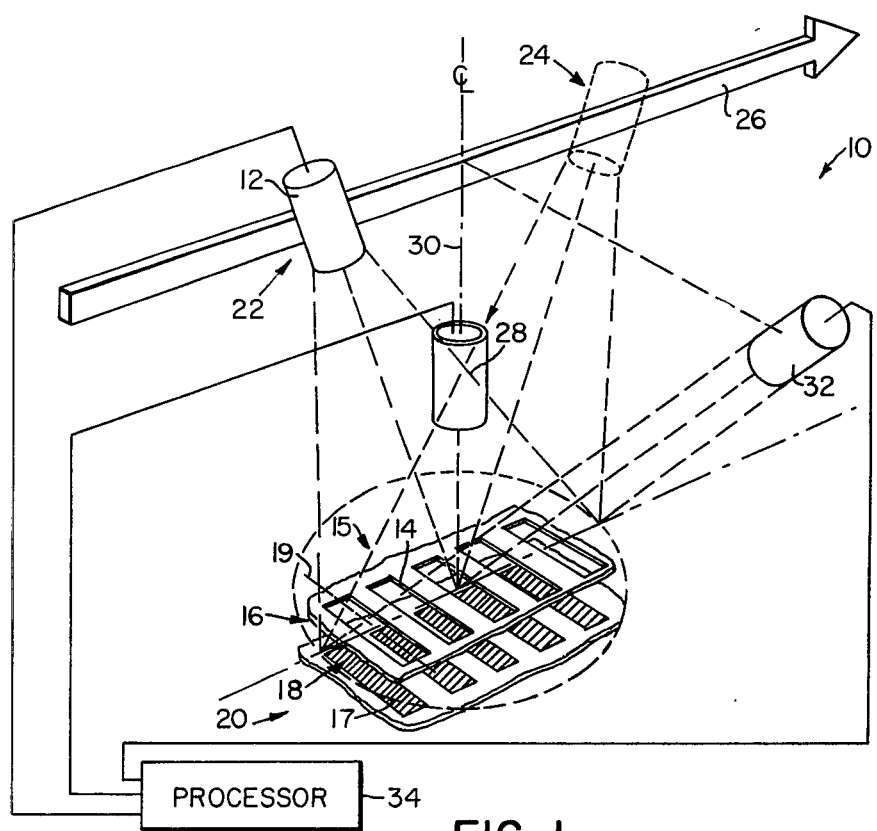
FIG. 1 is a schematic representation of a linear scan electro-optical system embodying the invention.

Referring now to the drawings, particularly FIG. 1, there is shown a schematic representation of a linear scan electro-optical system 10 representing one embodiment of the present invention. Radiation generated by a reference source 12 is directed towards apertures 14 in an aperture pattern 15 disposed in a reference plane 16 and towards reflectors 17 in a reflective pattern 18 disposed in a measurement plane 20. Reference plane 16 is in parallel space relationship with measurement plane 20 and separated therefrom approximately 1/100th of an inch. As hereinafter described, referencce source 12 is positioned at a location denoted by reference character 22 and is linearly scanned to a location denoted by reference character 24 along the direction 26 which is normal to a longitudinal axis 19 of apertures 14. The radiation generated by reference source 12 is sensed by a reference detector 28 positioned along a line 30 drawn between the centers of positions 22 and 24 to the center of one of the apertures 14, line 30 being normal to the travel plane of reference source 12. A convolution detector 32 located normal to the travel plane of reference source 12 is provided for detecting reflected radiation presented by the radiation generated by reference source 12 passing through apertures 14 and reflected by reflectors 17 in reflective pattern 18. Reference detector 28 and convolution detector 30 generate signals which are applied to a processor 34. A detailed block diagram of linear scan electro-optical system 10 is shown in FIG. 2.

Figure 2:
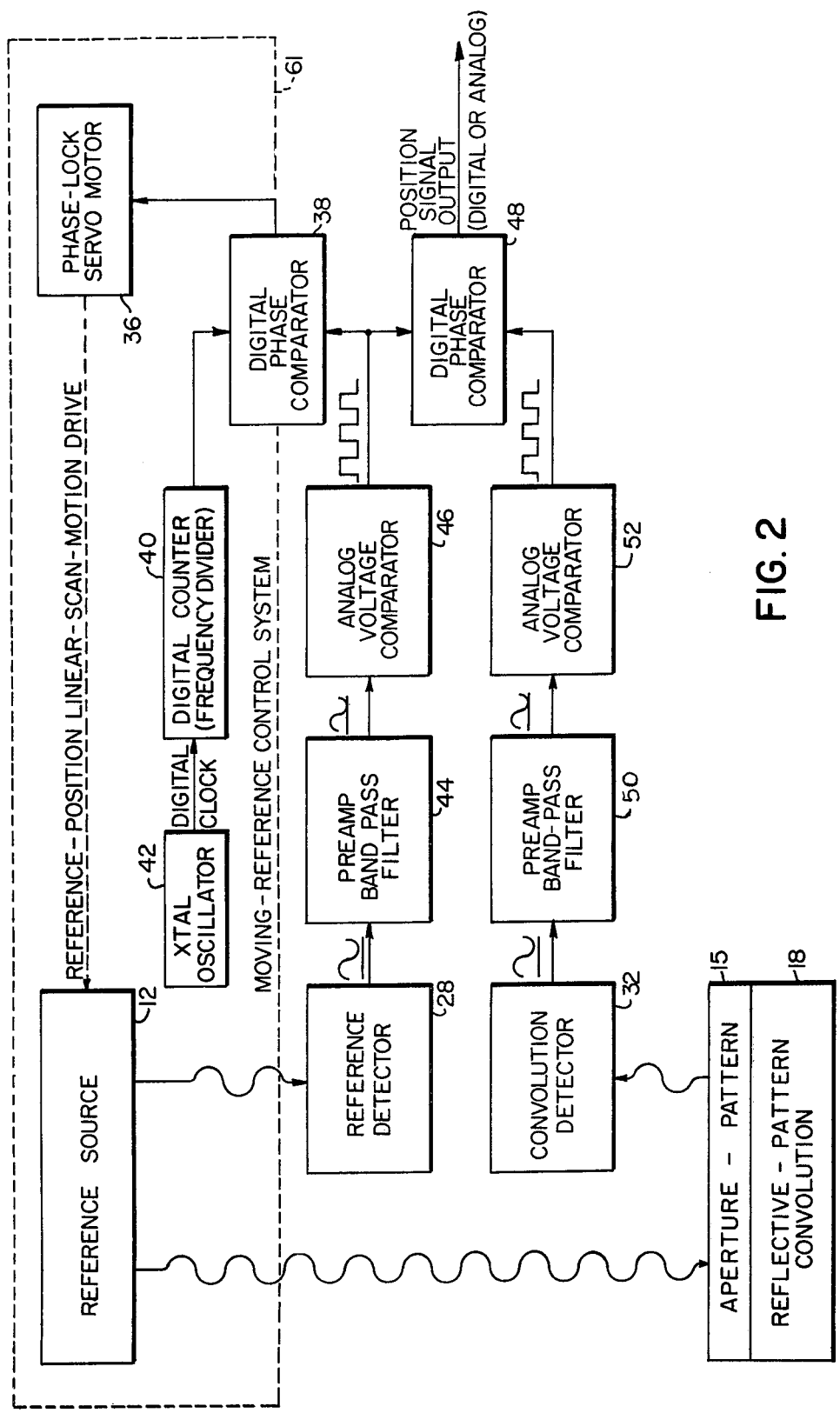
FIG. 2 is a block and schematic diagram of the linear scan electro-optical system of FIG. 1.

Referring now to FIG. 2, it will be seen that reference source 12 is operatively connected to a servo motor 36 which is controlled by a digital phase comparator 38. One input signal applied to digital phase comparator 38 is the signal at the output of a digital counter frequency divider 40 which receives a clock pulse from a digital clock 42, for example a crystal oscillator. The other input signal applied to digital phase comparator 38 is the signal at the output of reference detector 28 which is applied thereto via a band pass filter 44 and an analog voltage comparator 46. A signal at the output of analog voltage comparator 46 which is applied to digital phase comparator 38 is applied also to one input of a digital phase comparator 48. The other input signal applied to digital phase comparator 48 is the signal generated by convolution detector 32 and applied thereto via a band pass filter 50 and an analog voltage comparator 52. As hereinafter described, the signal at the output of digital phase comparator 48 respresents the relative displacements between aperture pattern 15 and reflective pattern 18.

Figure 3:
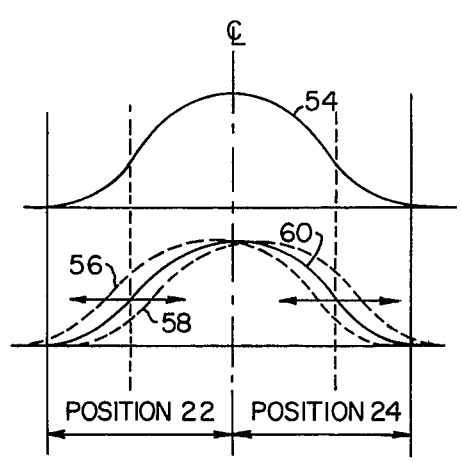
FIG. 3 is a series of waveforms illustrating the responses of the reference and convolution detectors of FIGS. 1 and 2.
Figure 4:
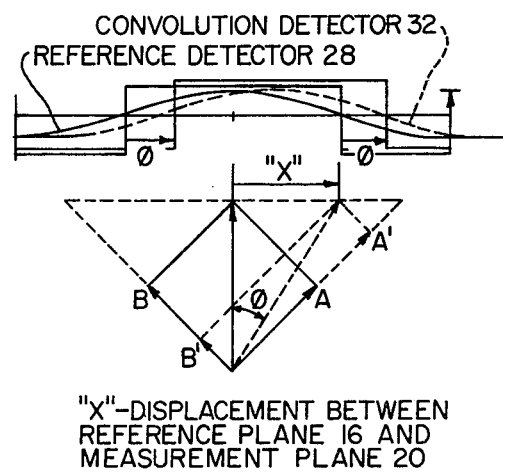
FIG. 4 is a vector representation of the fundamental Fourier component of the reference detector and convolution detector responses of FIG. 3.

As shown in FIG. 2, the radiation emitted by reference source 12 is sensed directly by reference detector 28 and is directed towards reflective pattern 18. The radiation reflected by reflectors 17 is sensed by convolution detector 32. The linear scan of reference source 12 produces periodic radiation waveforms which are detected by reference detector 28 and convolution detector 32. Reference detector 28 and convolution detector 32 response waveforms are shown in FIG. 3, the former being shown as a solid line 54 and the later being shown as dashed lines 56, 58 and a solid line 60. When measurement plane 20 is offset to the right of reference plane 16, as viewed in FIG. 1, the response of convolution detector 32 is shown by the dashed line 56 and when measurement plane 20 is displaced towards the left with respect to reference plane 16, the response of convolution detector 32 is shown by the dashed line 58. When measurement plane 20 and reference plane 16 are in registration, the response of convolution detector 32 is shown by the solid line 60. The periodic radiation variations detected by reference detector 28 and convolution detector 32 are caused by linearly scanning reference source 12 so as to produce a Moiré beat between the separated pattern planes. The scanning motion of reference source 12 is controlled by a phase lock loop 61 which includes crystal clock 42 for driving digital counter frequency divider 40. Digital counter frequency divider 40 generates a reference time phase signal which is compared in digital phase comparator 38 with the phase of the signal at the output of reference detector 28. The resultant phase differences correct scan speed so as to lock the scan motion to clock 42. As shown in FIG. 3, the periodic scan produced by periodic reticle apertures with optical stops is such that exactly one period is seen.

The convolution spatial, hence temporal, waveform phase is linearly shifted relative to the reference waveform phase by the relative displacement of reflective pattern 18 as seen by convolution detector 32 through aperture pattern 15. These relative temporal phase shifts are linearly measured by passing the temporal waveforms through band pass filters 44 and 50 to remove the DC and harmonic content, converting the fundamental waveforms at the outputs of band pass filters 44 and 50 to digital waveforms in analog zero-crossing voltage comparators 46 and 52, and measuring the time displacements of the digital waveforms at the output of analog voltage comparators 46 and 52 in digital phase comparator 48 to generate position signals defining the relative displacement of aperture pattern 15 and reflective pattern 18. In alternative embodiments, the time displacement measurement of the digital waveforms is accomplished by counting phase lock pulses with a digital counter or with precision analog techniques wherein time intervals are measured as a capacitor voltage by integrating a precision current source using operational amplifier and electronic switching techniques.

Figure 5:
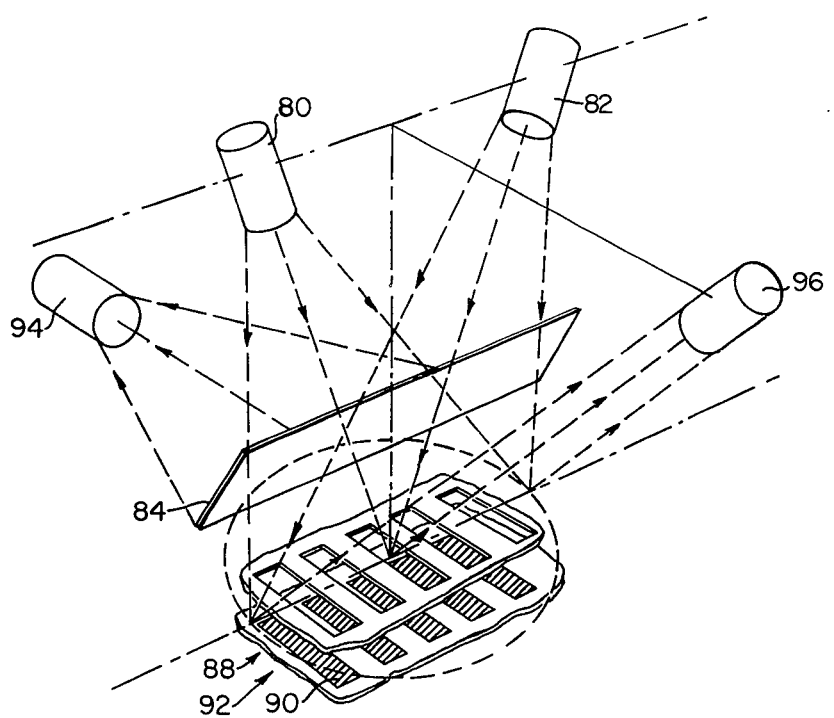
FIG. 5 is a schematic representation of a fixed reference electro-optical system embodying the invention.
Figure 7:
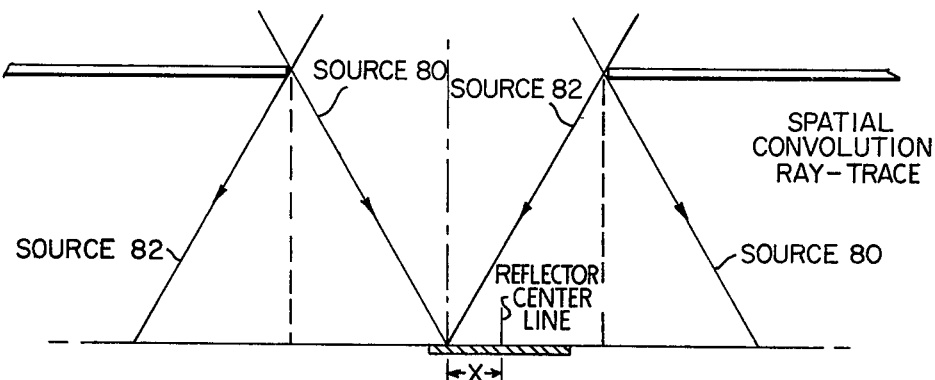
FIG. 7 is a schematic representation of the spatial convolution ray trace of the system of FIGS. 5 and 6.
Figure 8:
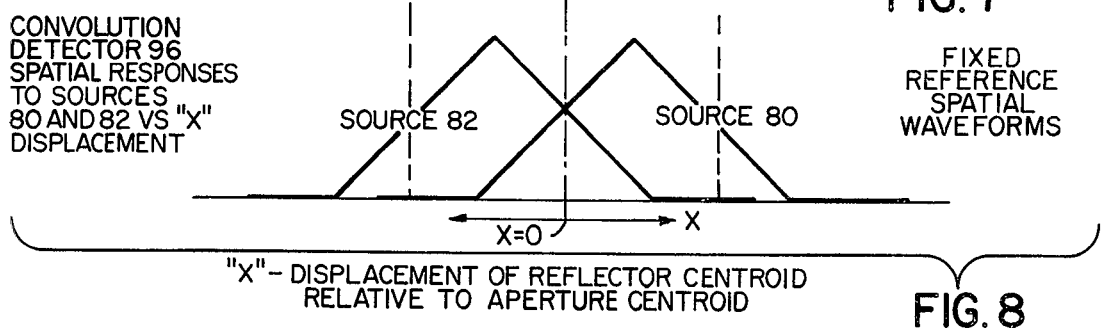
FIG. 8 is a series of waveforms illustrating the spatial responses of the convolution detector of FIGS. 5 and 6.
Figure 6:
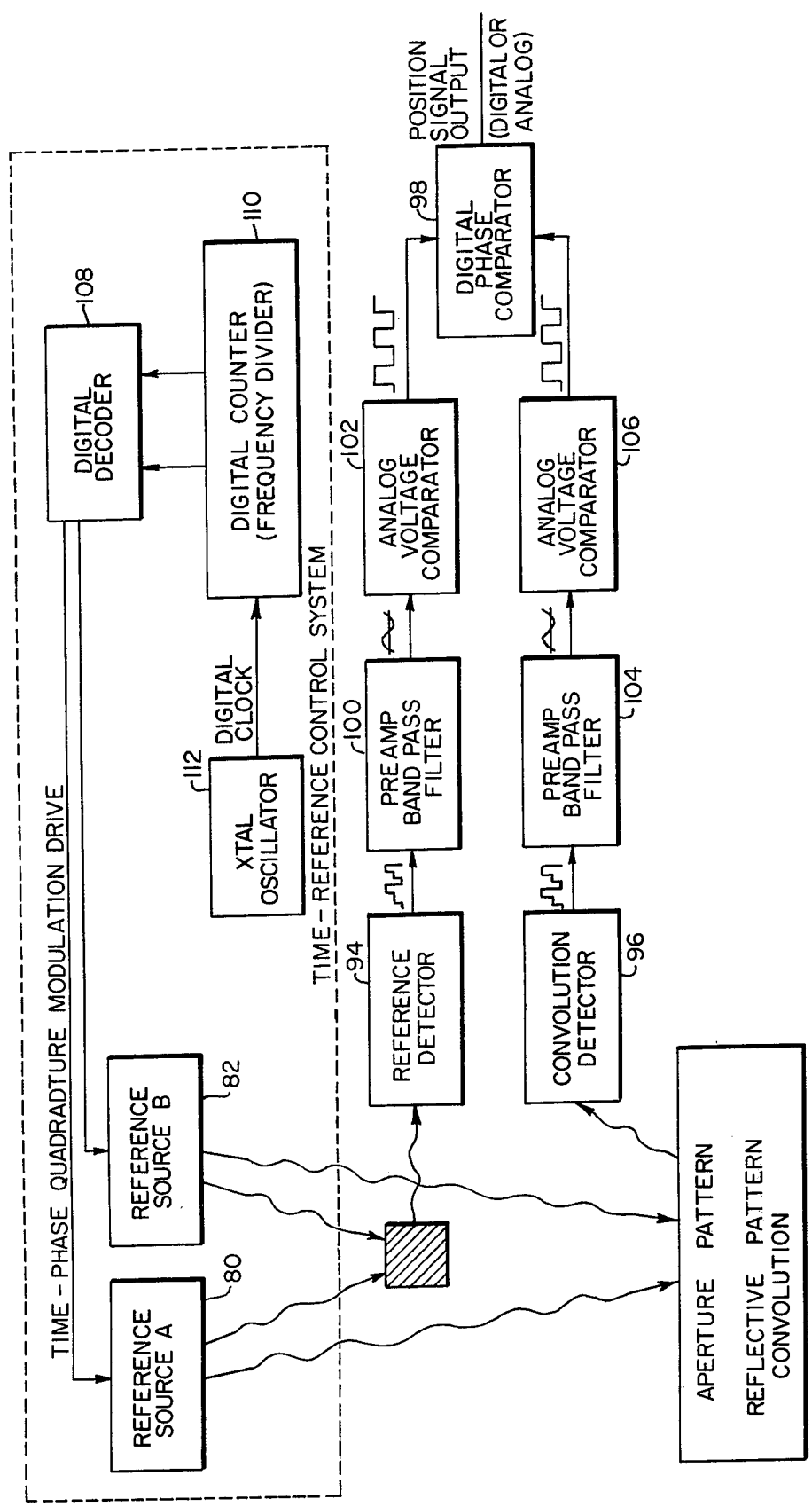
FIG. 6 is a block and schematic diagram of the fixed reference electro-optical system of FIG. 5.

Referring now to FIGS. 5–11, there is shown a fixed reference Fourier vernier electro-optical system 79, which illustrates the concept of Fourier analysis applied to spatial- temporal transformation such that no moving parts are required. As shown in FIGS. 5 and 6, the effect of a moving reference source is produced by two fixed reference sources 80 and 82 which are positioned in convolution space quadrature with respect to their radiation spatial-convolution reference patterns. The equivalent temporal relationships are provided by time-phase quadrature electrical modulation of the two fixed references sources 80 and 82, for example light emitting diodes. The spatial temporal quadrature relations, FIGS. 7–11, are the Fourier-analytical equivalent of the phase-locked spatial-temporal reference source scan described hereinbefore in connection with FIGS. 1–4.

Illumination emitted by light emitting diodes 80 and 82 is directed towards a reference reflector 84 and towards apertures 86 in a reference plane 88 and reflectors 90 in a measurement plane 92. The illimination emitted by light emitting diodes 80 and 82 is directed by the reference reflector 84 towards a reference detector 94 and is also directed through apertures 86 towards reflectors 90. The reference illumination is sensed by reference detector 94 and the reflected illumination is sensed by a convolution detector 96. Reference sources 80 and 82 are disposed in a plane which is normal to the plane of the longitudinal axis of reference detector 94 and lie along a line which is normal to apertures 86 and reflectors 90. Convolution detector 96 is positioned along a line which is perpendicular to the center of a line drawn between reference sources 80, 82 and which intersects the center of one of the apertures 86. Reference reflector 84 directs the rays from reference sources 80, 82 to reference detector 94 and blocks the rays reflected by reflector 90 from reference detector 94. Reference detector 94 and convolution detector 96 are in a plane which is parallel to the longitudinal axis of apertures 86 and reflectors 90. In the illustrated embodiment, each aperture 86 has a rectangular profile of 0.025 by 0.020 inches and each reflector 90 has a substantially rectangular profile of 0.25 inches by 0.010 inches. As described in connection with the embodiment of FIGS. 1–4, the reference and measurement planes are separated to produce an optical Moiré beat with relative displacements of the patterns. Fixed reference sources 80 and 82 irradiated reflectors 90 through the references apertures 86 such that their radiation convolution which produce the convolution detector 96 responses are in space quadrature with respect to the reflector centroid position relative to the aperture centroid position as shown by the ray traces and spatial convolution waveforms of FIGS. 7 and 8, respectively.

The illumination emitted by fixed reference sources 80 and 82 is directed towards reference reflector 84 and is sensed by reference detector 94. Reference reflector 84 is oriented in such a manner that reference detector 94 received radiation from reference sources 80 and 82 in the same relative porportions as that directed towards reference apertures 86 so as to provide complete immunity from normal variations of reference source intensities. Reference reflector 84 prevents any measurement plane 92 radiation reflections from being seen by reference detector 94 and further prevents any reference reflector 84 radiation reflections from being seen by convolution detector 96 so as to avoid mixing of reference and convolution radiation signals.

The signal processing is similar to the linear scan reference system 10 hereinbefore described with the exception of the reference control system which provides time instead of space modulation. The resultant time quadrature modulation of the space quadrature reference sources produces time quadrature waveforms of the type shown in FIG. 9. The signal at the output of reference detector 94 is applied to a digital phase comparator 98 via a band pass filter 100 and an analog voltage comparator 102. The signal at the output of convolution detector 96 is applied to digital phase comparator 98 via a band pass filter 104 and an analog voltage comparator 106. Band pass filters 100 and 104 operate to remove the DC and harmonic content of the signals generated by reference detector 94 and convolution detector 96, respectively. The signal at the output of digital phase comparator 98 is a displacement signal representing the relative displacement between apertures 86 in reference plane 88 and reflectors 90 in measurement plane 92. The resultant time quadrature modulation of the space quadrature reference sources 80, 82 produce time quadrature waveforms (FIG. 9) which differ up to the input terminals of band pass filters 100 and 104, but are identical at the output terminals of the band pass filters 100 and 104 by virture of the Fourier theorem applied to the spatial convolutions transformed to equivalent temporal convolutions by time modulation. Time phase quadrature modulation drive signals are applied to reference sources 80 and 82 from a digital decoder 108 which is driven by a digital counter frequency divider 110. Clock pulses generated by a digital clock 112, for example a crystal oscillator, is applied to digital counter frequency divider 110.

Another difference is signal processing is related also to the time instead of space modulation provided by the reference control system. Absolute and differential reference source intensity variations are completely compensated by the resultant corresponding reference phase variations. For example, absolute intensity variations produce no phase shift of either reference or convolution waveforms and differential intensity variations produce identical phase shifts of both reference and convolution waveforms. In both cases, position readout variations due to differential phase shifts which are caused by source intensity variations are completely eliminated by the reference phases compensation. As a consequence of this inherent immunity to source intensity variations, phasor sensitivity to displacement can be increased with no sacrifice of stability by subtraction of a fraction of the analog reference signal from the analog convolution signal prior to the analog comparators shown in FIGS. 2 and 6. This increase in phasor sensitivity to displacement can be readily appreciated by inspection of the phasor diagrams in FIGS. 3, 4, 9, 10 and 11.

From the foregoing, it will be appreciated that the present invention provides an electro-optical system for generating phase signals representing relative displacement between an aperture pattern in a reference plane and a reflective pattern in a measurement plane. The phase of a signal generated by a convolution detector is compared to a phase of a signal generated by a reference detector for generating data signals defining the relative displacement between the aperture pattern and the reflective pattern. The foregoing descriptions of moving and fixed reference embodiments cover applications in which optical measurements are to be made of displacements of measurement patterns relative to reference patterns. For null-seeking system, such as the requirement for registration or alignment to a single position, the preceeding descriptions are complete.

For general metrology applications, such an angular and linear optical encoders, readout linearly and sensitivity stability are required. The moving reference system has these properties inherent in its design. The fixed references Fourier vernier can have these properties by optical design of the convolution detector spatial response to be sinusoidal with the period equal to the reference and measuring patterns and with no harmonics. Further, by use of a continuous periodic reflective pattern, distances of many periods can be measured by use of a second reference aperture vernier in phase quadrature with respect to the first, as with well known encoder techniques used in construction with up-down digital counters. Thus, these techniques can be combinded with existing and encoder techniques to provide a position-readout resolution orders of magnitude beyond the present state of the art which is presently restricted to diffraction limited resolution.

The fixed reference Fourier vernier linearity is limited by harmonic content of the convolution detectors spatial response. Inherent linearity is provided by the moving reference vernier which would be used in the highest revolution application such that resolution is limited only by the reference source quantum shot noise which produces space-time noise at the band pass filter output zero-crossing times. Thus, it is apparent that optical resolution is limited only by reference source intensity, optical speed of the convolution optical system and the sampling rate. It should also be noted that the previously described systems can use transmissive measurement patterns for increased optical speed of the convolution optical system.

Since certain changes may be made in the foregoing description without departing from the scope of the invention herein involved, it is intended that all matter contained in the above description and depicted in the accompanying drawings be construed in an illustrative sense and not in a limiting sense.

What is claimed is:

1. A device for processing data, said device comprising:
   a. source means for generating a first signal;
   b. reference means communicating with said source means for receiving said first signal and for generating a second signal having a reference component and a quadrature component;
   c. convolution means communicating with said source means for receiving said first signal and for generating a third signal having a reference component and a quadrature component, said third signal constituting a convolution of said first signal;
   d. first processing means operatively connected to said reference means for receiving said second signal, said first processing means generating a fourth signal constituting a resultant of said second signal reference and quadrature components generated by said reference means;

e. second processing means operatively connected to said convolution means for receiving said third signal, said second processing means generating a fifth signal representing a resultant of said third signal reference and quadrature components generated by said convolution means; and f. comparator means operatively connected to said first and second processing means, said fourth signal and fifth signal applied to said comparator means, said comparator means comparing said fourth signal and said fifth signal and generating a sixth signal representing the difference in phase of said fourth signal and said fifth signal.

* * * * *